(12) United States Patent
Wang et al.

(10) Patent No.: US 7,570,963 B2
(45) Date of Patent: Aug. 4, 2009

(54) METHOD AND SYSTEM TO IMPROVE EFFICIENCY OF MOBILE STATION DURING LISTENING INTERVAL

(75) Inventors: Huai Y. Wang, Coconut Creek, FL (US); Floyd D. Simpson, Lake Worth, FL (US)

(73) Assignee: Motorola, Inc., Schaumburg, IL (US)

( * ) Notice: Subject to any disclaimer, the term of this patent is extended or adjusted under 35 U.S.C. 154(b) by 299 days.

(21) Appl. No.: 11/411,570

(22) Filed: Apr. 26, 2006

(65) Prior Publication Data

US 2007/0254686 A1 Nov. 1, 2007

(51) Int. Cl.
*H04W 68/00* (2006.01)
(52) U.S. Cl. .................. 455/458; 455/436; 455/442; 455/466; 370/331
(58) Field of Classification Search .................. 455/458, 455/436, 442, 466; 370/331
See application file for complete search history.

(56) References Cited

U.S. PATENT DOCUMENTS 6,094,575 A * 7/2000 Anderson et al. ......... 455/422.1

FOREIGN PATENT DOCUMENTS

| EP | 0 815 654 B1 | 3/2005 |
| EP | 0 882 328 B1 | 12/2005 |
| WO | WO 94/13074 | 6/1994 |
| WO | WO 96/23390 | 8/1996 |

* cited by examiner

*Primary Examiner*—Nghi H Ly
(74) *Attorney, Agent, or Firm*—Larry G. Brown

(57) ABSTRACT

The invention concerns a method (200) and system (100) for improving the efficiency of a mobile station (112) during a listening interval (310). The method can include the step of setting (212) a paging message indicator (414) or a neighbor advertisement message indicator (416) in which the paging message indicator indicates whether a paging message (314) is the last paging message designated for the mobile station in the listening interval and the neighbor advertisement message indicator indicates the presence of a neighbor advertisement message (316). The method can also include the step of transmitting (214) the paging message indicator or the neighbor advertisement message indicator to the mobile station. Based on these indicators, the mobile station can selectively enter a sleep state during and/or after the listening interval to conserve battery life.

20 Claims, 3 Drawing Sheets

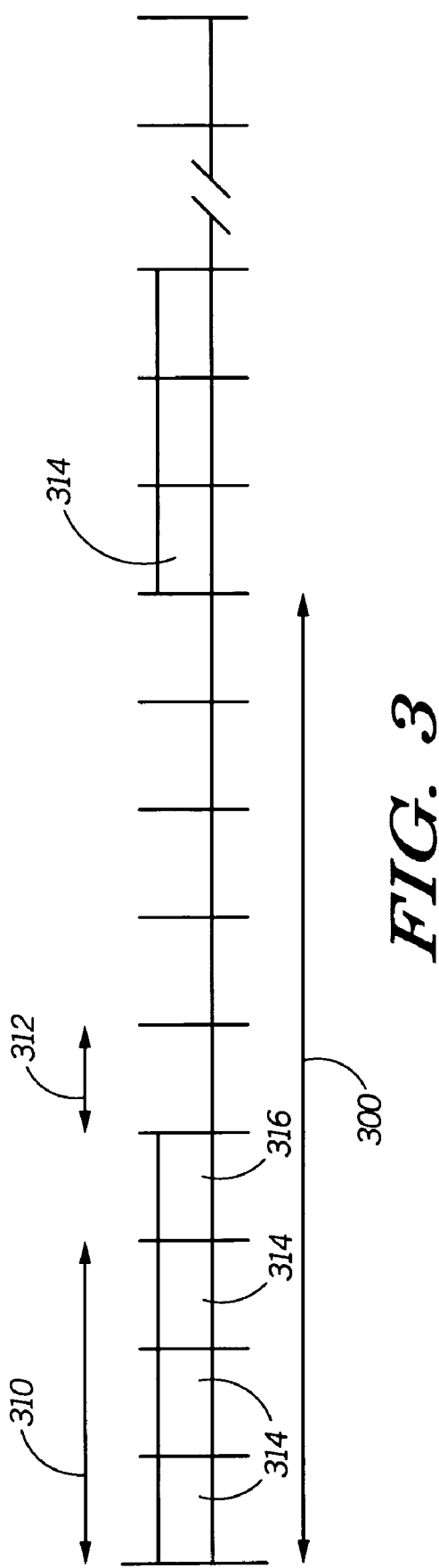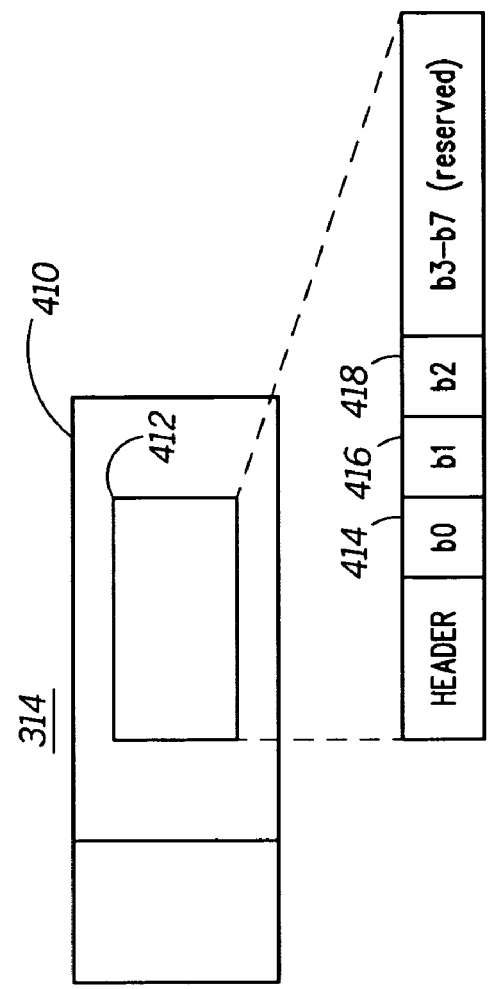

METHOD AND SYSTEM TO IMPROVE EFFICIENCY OF MOBILE STATION DURING LISTENING INTERVAL

BACKGROUND OF THE INVENTION

1. Field of the Invention

The present invention concerns the management of paging listening intervals and more particularly, the management of such intervals to improve the efficiency of mobile stations.

2. Description of the Related Art

The idle mode operation in the current specification for IEEE 802.16e defines periodic paging listening intervals that mobile subscriber stations (MSS) tune to in order to receive a series of broadcast paging messages from a base station (BS). Additionally, the BS may assign a number of MSSs to a particular paging group—depending on the functionality and/or desire of the MSSs—that has a predetermined paging cycle. The duration of a paging cycle may vary, with a shorter paging cycle typically reserved for groups of MSSs with time-sensitive applications, such as push-to-talk (PTT) (i.e., dispatch), which may lead to a paging cycle as short as 300 milliseconds (ms). Each listening interval defines the beginning of a paging cycle, and the listening intervals are comprised of one or more frames, the length of which some entities have set at 5 ms.

The 802.16e specification requires the BS to broadcast paging messages during the listening interval, and these paging messages contain information that will be processed by the MSSs receiving it to enable the MSSs to carry out their relevant applications. The standard also requires the MSSs to process every frame of the listening interval, even if an MSS is not being paged. Moreover, certain entities or companies also call for a neighbor advertisement message and/or other broadcast messages to be selectively inserted at the end of a listening interval. The neighbor advertisement message, which contains information about neighboring BSs, allows the MSS to gather data on neighboring BSs for a prompt handover to a neighboring BS when it becomes necessary to do so. To prevent the BS from being overwhelmed by the transmission of the neighbor advertisement messages, however, these messages are inserted only after selected listening intervals. That is, certain listening intervals may not have a neighbor advertisement message positioned at the end of the interval.

During a listening interval, the MSS will process each of the incoming paging messages and will continue to stay awake for the duration of the listening interval so long as it does not detect a paging message designated for its receipt. The MSS will also process the frame after the interval to see if a neighbor advertisement message is present. This process is extremely inefficient because none of the paging messages may be designated for the MS receiving them. Even worse, the MS may continue to stay awake for a neighbor advertisement message that may not be present at the end of the listening interval. The impact on standby battery life is also exacerbated if the paging cycle is short, such as for a group of dispatch MSSs, because the MSS is constantly waking up to listen in the listening interval and the portion of the cycle that may or may not contain the neighbor advertisement message.

SUMMARY OF THE INVENTION

The present invention concerns a method for improving the efficiency of a mobile station during a listening interval. The method can include the steps of setting a paging message indicator or a neighbor advertisement message indicator and transmitting the paging message indicator or the neighbor advertisement message indicator to the mobile station. The term "or" here may be exclusive, meaning that the paging message indicator and the neighbor advertisement message indicator are not necessarily required to be transmitted together, as only one of them may be so transmitted. In one arrangement, the paging message indicator can indicate whether a paging message is the last paging message designated for the mobile station in the listening interval, and the neighbor advertisement message indicator can indicate the presence of a neighbor advertisement message. Other broadcast message indicators may be employed to also improve the efficiency of the mobile stations.

The method can also include the step of—during an idle mode in the mobile station—receiving the paging message indicator or the neighbor advertisement message indicator. Based on the paging message indicator, it can be determined that no other paging messages are present in the listening interval. Also, based on the neighbor advertisement message indicator, it can be determined that no neighbor advertisement message, or some other suitable broadcast message, is present.

The method can also include the step of—in the mobile station—switching to another function other than continuing to receive in the listening interval during the remaining portion of the listening interval if it is determined that no other paging messages are present in the listening interval. In another arrangement, switching to another function other than continuing to receive for the neighbor advertisement message during the duration of time reserved for processing a neighbor advertisement message can be performed if it is determined that no neighbor advertisement message is present. As an example, switching to another function can include switching to a low power state, such as a sleep or idle mode.

In another arrangement, the method can include assigning one or more mobile stations to a group having a predetermined paging cycle. As an example, the listening interval may define the beginning of the paging cycle, and the listening interval is comprised of one or more frames. As another example, the neighbor advertisement message may be positioned after the listening interval. The paging message indicator or the neighbor advertisement message indicator may be transmitted to the mobile station in a paging message map of a paging message. For example, the paging message map is a vendor specific type-length-value for IEEE standard 802.16e.

The present invention also concerns a method for improving the efficiency of a mobile station during a listening interval. The method can include the step of—during an idle mode—receiving from a base station a paging message indicator or a neighbor advertisement message indicator. The term "or" here may be exclusive, meaning that the paging message indicator and the neighbor advertisement message indicator are not necessarily required to be received together, as only one of them may be so received. As an example, the paging message indicator may indicate whether a paging message is the last paging message designated for the mobile station in the listening interval, and the neighbor advertisement message indicator may indicates the presence of a neighbor advertisement message. Based on the paging message indicator, it can be determined that no other paging messages are present in the listening interval. Moreover, based on the neighbor advertisement message indicator, it can be determined that no neighbor advertisement message is present.

The present invention also includes a base station that improves the efficiency of a mobile station during a listening interval. The base station can include a transmitter and a processor communicatively coupled to the transmitter. In one arrangement, the processor may be programmed to set a paging message indicator or a neighbor advertisement message indicator and to instruct the transmitter to transmit the paging message indicator or the neighbor advertisement message indicator to the mobile station. The term "or" here may be exclusive, meaning that the paging message indicator and the neighbor advertisement message indicator are not necessarily required to be transmitted together, as only one of them may be so transmitted. As an example, the paging message indicator may indicate whether a paging message is the last paging message designated for the mobile station in the listening interval, and the neighbor advertisement message indicator may indicate the presence of a neighbor advertisement message. The processor may be programmed to carry out any of the functions described above.

Finally, the invention also includes a mobile station that has a receiver and a processor, wherein the processor is communicatively coupled to the receiver. The processor can be programmed to—in an idle mode—receive a paging message indicator or a neighbor advertisement message indicator. The term "or" here may be exclusive, meaning that the paging message indicator and the neighbor advertisement message indicator are not necessarily required to be received together, as only one of them may be so received. As an example, the paging message indicator may indicate whether a paging message is the last paging message designated for the mobile station in a listening interval. Additionally, the neighbor advertisement message indicator may indicate the presence of a neighbor advertisement message. Based on the paging message indicator, the processor can determine that no other paging messages are present in the listening interval. Based on the neighbor advertisement message indicator, the processor may determine that no neighbor advertisement message is present. This processor may also be programmed to carry out any of the functions described above.

The invention is also directed to another method for improving the efficiency of a mobile station during a listening interval. The method can include the step of setting a paging message indicator or a second message indicator. The paging message indicator may indicate whether a paging message is the last paging message designated for the mobile station in the listening interval. Also, the second message indicator may indicate the presence of a second message following the listening interval. The paging message indicator or the second message indicator can be transmitted to the mobile station.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

FIG. 3 illustrates an example of a paging cycle in accordance with an embodiment of the inventive arrangements; and FIG. 4 illustrates an example of a paging message in accordance with an embodiment of the inventive arrangements.

DETAILED DESCRIPTION OF THE INVENTION

Figure 1:
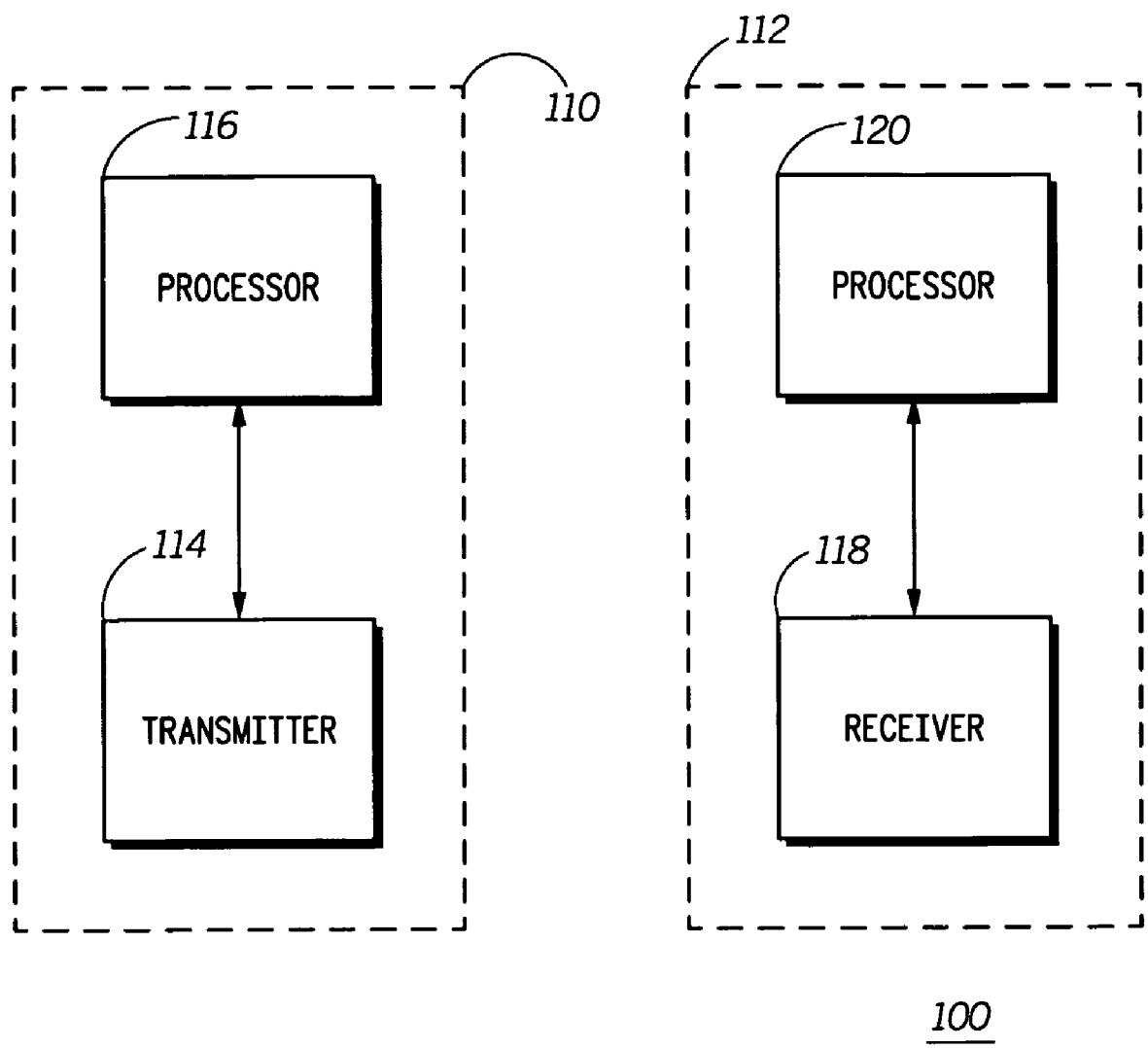
FIG. 1 illustrates a system for improving the efficiency of an MSS during a listening interval in accordance with an embodiment of the inventive arrangements.

While the specification concludes with claims defining the features of the invention that are regarded as novel, it is believed that the invention will be better understood from a consideration of the following description in conjunction with the drawings, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled" as used herein, are defined as connected, although not necessarily directly, and not necessarily mechanically. The term "processor" can include any component or group of components, including any relevant hardware and/or software, that can carry out the functions described in relation to the inventive arrangements herein.

The present invention concerns a method and system for improving the efficiency of an MSS during a listening interval. The method can include the step of setting a paging message indicator or a neighbor advertisement message indicator in which the paging message indicator indicates whether a paging message is the last paging message designated for the MSS in the listening interval and the neighbor advertisement message indicator indicates the presence of a neighbor advertisement message. The method can also include the step of transmitting the paging message indicator or the neighbor advertisement message indicator to the MSS. Based on these indicators, the MSS can selectively enter a low power state during and/or after the listening interval to conserve battery life.

Referring to FIG. 1, a system 100 for improving the efficiency of an MSS during a listening interval is shown. In one arrangement, the system 100 can include one or more BS 110 and one or more MSS 112, which are communicatively coupled (for simplicity, BS and MSS may refer to both units in the singular or plural). As an example, the BS 110 can be implemented in a wide area network (WAN), although the invention is not so limited, as the BS 110 can be part of any other suitable communications network. In fact, the term base station can refer to any component that is or components that are capable of exchanging wireless signals with any suitable number of mobile communications devices. As shown in FIG. 1, the BS 110 can include a transmitter 114 and a processor 116, which can execute several functions, some of which will be described below. The processor 116 can be communicatively coupled to the transmitter 114.

The MSS 112 can be any suitable device that is capable of exchanging wireless signals with the BS 110. The MSS 112 can perform any suitable number of functions, such as making interconnect, dispatch or VoIP calls, multimedia applications and e-mail, although the invention is not limited to this particular listing. In this example, the MSS 112 can include a receiver 118 and a processor 120, which can be communicatively coupled to the receiver 118. As will be described below, the processor 118 can take certain actions to make the MSS 112 a more efficient unit.

Figure 2:
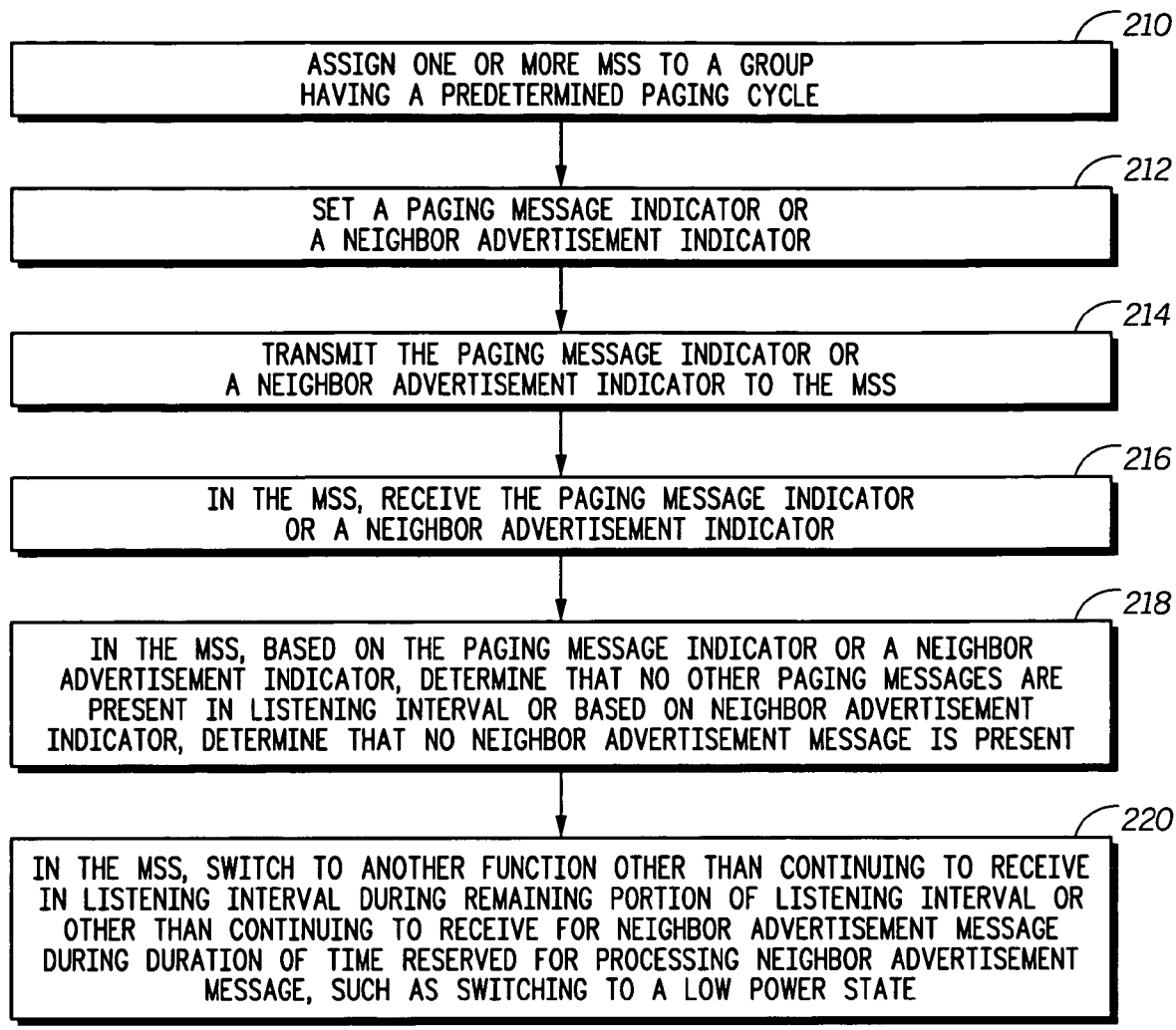
FIG. 2 illustrates a method for improving the efficiency of an MSS during a listening interval in accordance with an embodiment of the inventive arrangements.

Referring to FIG. 2, a method 200 for improving the efficiency of an MSS during a listening interval is shown. When describing the method 200, reference will be primarily made to FIG. 1, although it is understood that the method 200 can be practiced in any other suitable system or device. Reference may also be made to FIGS. 3 and 4, which respectively show an example of a paging cycle and an example of a paging message, although the invention is in no way limited to these particular examples. Moreover, the steps of the method 200 are not limited to the particular order in which they are presented in FIG. 2. The inventive method can also have a greater number of steps or a fewer number of steps than those shown in FIG. 2.

At step 210, one or more MSS can be assigned to a group having a predetermined paging cycle and listening interval. At step 212, a paging message indicator or a neighbor advertisement message indicator can be set, and these indicators can be transmitted to the MSSs in the group, as shown at step 214. An example will be presented in which reference will be made to FIGS. 1 and 3.

As is known in the art, the MSS 112 may enter an idle mode to conserve battery life. For purposes of the invention, the term idle mode can refer to a mobile unit being de-registered from a communications network. During the idle mode, however, the MSS 112 may still need to continue to periodically monitor for transmissions from the BS 110. As such, the BS 110 can assign one or more of the MSS 112 to a paging group having a predetermined paging cycle and listening interval.

An example of a paging cycle 300 is shown in FIG. 3, the duration of which is represented by the double arrow. In one arrangement, the paging cycle 300 can include one or more listening intervals 310 (duration also represented by a double arrow), and both the paging cycle 300 and the listening interval 310 can be comprised of one or more frames 312 (duration also represented by a double arrow). The listening interval 310 can define the beginning of the paging cycle 300, and the paging cycle 300 can be of any suitable duration. The MSS 112 can monitor for transmissions from the BS 110 during the listening interval 310 and can enter a low power state in which its receiver 118 (or some other suitable component(s)) is temporarily turned off by the processor 120 for the remainder of the paging cycle 300.

As noted earlier, the duration of a particular paging cycle 300 may depend on the applications or functions performed by the MSS 112. In this example, the MSS 112 can support dispatch communications, which can require a relatively short paging cycle 300 to reduce the set-up time for a dispatch call. As such, this paging cycle 300 may be roughly 300 ms long, although it is understood that the paging cycle 300 can be of any other suitable duration. Also, the frames 312 may be of any suitable duration, although for purposes of this example, they may be considered 5 ms long and both the listening interval 310 and the paging cycle 300 may have a duration that is an integer multiple of the length of the frames 312. Additionally, the frames 312 may be considered orthogonal frequency division multiple access (OFDMA) frames, although the invention is not limited to this particular embodiment.

As described earlier, the BS 110 may periodically transmit paging messages and neighbor advertisement messages, which the MSS 112, when in idle mode, can receive and process. As shown in FIG. 3, the BS 110 can transmit one or more paging messages 314 over one or more of the frames 312, which the MSS 112 can receive during the listening interval 310. The BS 110 may also transmit one or more neighbor advertisement messages 316 over the frames 312. In one arrangement, the neighbor advertisement message 316 may be received by the MSS 112 at the end of the listening interval 310, although the invention is not limited as such. Moreover, a neighbor advertisement message 316 may not be transmitted for every paging cycle 300, depending on network load conditions. Although FIG. 3 shows a one-to-one correspondence between the frames 312 and the paging messages 314 and the neighbor advertisement messages 316, it is understood that the messages 314 and 316 may be longer or shorter in duration than the frames 312.

Referring to FIG. 4, an example of a portion of a paging message 314 is shown. In one arrangement, the paging message 314 can be in compliance with the IEEE standard of 802.16e, although the paging message 314 may apply to any other suitable transmission standard or protocol. As an example and also without limitation, the neighbor advertisement message 316 (see FIG. 3) may also comply with the 802.16e standard. For simplicity, only a payload portion 410 of the paging message 314 is shown here, and this payload portion 410 can include a paging message map 412. As an example, the paging message map 412 may be a vendor specific type-length-value (TLV), as set forth in the 802.16e paging message format. As an example, the paging message map 412 may include a paging message indicator 414 and a neighbor advertisement message indicator 416. As an option, the paging message map 412 may also include a new neighbor advertisement message indicator 418. As an example, the paging message map 412 can be one byte in length, and each of the indicators 414, 416 and 418 can be one bit. It is understood, however, that the invention is not limited to this particular configuration, as the paging message 314 and/or the paging message map 412 can be arranged in other suitable formats.

Referring now to FIGS. 1, 3 and 4, in accordance with an embodiment of the inventive arrangements, the BS 110 may set the paging message indicator 414 and/or the neighbor advertisement message indicator 416. Through this setting, the paging message indicator 414 can indicate whether a paging message 314 is the last paging message 314 designated for the MSS 112 in the listening interval 310. Those of skill in the art will appreciate that the paging messages 314 may actually be designated for all the MSSs 112 in a paging group, although the description here focuses on one MSS 112 for clarity. Further, the neighbor advertisement message indicator 316 can indicate the presence of the neighbor advertisement message 316. The BS 110 can then transmit the indicators 314, 316 to the MSS 112, such as over one or more OFDMA frames.

Referring back to the method 200 of FIG. 2, at step 216, in the MSS, the paging message indicator or the neighbor advertisement message indicator can be received. Based on the paging message indicator, the MSS can determine that no other paging messages are present in the listening interval. In addition, based on the neighbor advertisement message indicator, the MSS can determine that no neighbor advertisement message is present. In response, the MSS can switch to another function other than continuing to receive in the listening interval during the remaining portion of the listening interval if the MSS determines that that no other paging messages are present in the listening interval, as shown at step 220. As also shown at step 222, the MSS can switch to another function other than continuing to receive for the neighbor advertisement message during the duration of time reserved for the processing of the neighbor advertisement message. As an example, switching to another function can be switching to a low power state, such as sleep or idle mode. A low power state is any state in which an electronic device shuts down portions of the device to save battery life when those portions are not needed.

For example, referring once again to FIGS. 1, 3 and 4, the MSS 112, during the idle mode, can receive a first paging message 314 in the listening interval 310 and can check the paging message indicator 414. The indicator 414 may be set to indicate that the paging message 314 is the last paging message 314 in the listening interval 310 designated for the MSS 112. If so, the processor 120 of the MSS 112 can shut down the receiver 118 or any other suitable component for the remainder of the listening interval 310, i.e., it is unnecessary for the MSS 112 to continue listening to or processing the rest of the listening interval 310. Conversely, if the paging message indicator 414 is set to indicate that the first paging message 314 is not the last paging message 314 for the MSS 112, the MSS 112 can continue to receive and process the incoming paging messages 314. This process may continue until the MSS 112 determines that a paging message 314 is the last paging message 314 in the listening interval 310 designated for the MSS 112.

A similar technique can be employed for the neighbor advertisement message 316, too. For example, the neighbor advertisement message indicator 416 can enable the MSS 112 to determine whether a neighbor advertisement message 316 is present, such as at the end of the listening interval 310. Again, if the indicator 416 indicates that the message 316 is not present, the appropriate portions of the MSS 112 may enter a low power state. If the indicator 416 indicates that the message 316 is present, the MSS 112 may activate any relevant components to process the message 316 at the appropriate time. In either of these arrangements, because portions of the MSS 112 can be shut down during and after the listening interval, the battery life of the MSS 112 can improve.

As an option, the BS 110 may also set the new neighbor advertisement message indicator 418. This indicator 418 can enable the MSS 112 to determine that a neighbor advertisement message 316 that is present is also "new." In particular, the MSS 112 may be stationary and the neighbor advertisement messages 316 that the MSS 112 is receiving are redundant. As such, the indicator 418 can signal the MSS 112 that the incoming neighbor advertisement message 316 contains new information, as compared to the previous message 316. The MSS 112 can then process this message 316. If the indicator 418 indicates that the neighbor advertisement message 316 does not contain new information, i.e., it is redundant, the MSS 112 can ignore the message 316. Portions of the MSS 112 can then be shut down during the time when this redundant message 316 would be received.

The examples above describe portions of the MSS 112 being shut down when the MSS 112 determines that the paging message 314 is the last paging message 314 in the listening interval 310 or that the neighbor advertisement message 316 is not present or is redundant. The invention is not limited to this procedure, however. For example, during the newly available time, the MSS 112 can perform other suitable functions, such as neighbor scanning, channel condition reporting or other radio resource management activities. This process can improve the overall efficiency of the MSS 112.

It must be understood that the invention is not limited to setting, transmitting or receiving only paging message indicators or neighbor advertisement message indicators. Other suitable indicators may be so set, transmitted and received. These other indicators may be part of the message map described above, and there is virtually no limit as to what can be transmitted to the mobile stations to prompt them to take certain actions.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for improving the efficiency of a mobile station during a listening interval, comprising:
   setting a paging message indicator or a neighbor advertisement message indicator, wherein the paging message indicator indicates whether a paging message is the last paging message designated for the mobile station in the listening interval and the neighbor advertisement message indicator indicates the presence of a neighbor advertisement message; and
   transmitting the paging message indicator or the neighbor advertisement message indicator to the mobile station.

2. The method according to claim 1, further comprising:
   during an idle mode in the mobile station, receiving the paging message indicator or the neighbor advertisement message indicator; and
   based on the paging message indicator, determining that no other paging messages are present in the listening interval or based on the neighbor advertisement message indicator, determining that no neighbor advertisement message is present.

3. The method according to claim 2, further comprising, in the mobile station, switching to another function other than continuing to receive in the listening interval during the remaining portion of the listening interval if it is determined that no other paging messages are present in the listening interval or switching to another function other than continuing to receive for the neighbor advertisement message during the duration of time reserved for processing a neighbor advertisement message if it is determined that no neighbor advertisement message is present.

4. The method according to claim 3, wherein switching to another function comprises switching to a low power state.

5. The method according to claim 1, further comprising:
   assigning one or more mobile stations to a group, wherein the group has a predetermined paging cycle.

6. The method according to claim 5, wherein the listening interval defines the beginning of the paging cycle and the listening interval is comprised of one or more frames and wherein the neighbor advertisement message is positioned after the listening interval.

7. The method according to claim 1, wherein the paging message indicator or the neighbor advertisement message indicator is transmitted to the mobile station in a paging message map of a paging message.

8. The method according to claim 7, wherein the paging message map is a vendor specific type-length-value for Institute of Electrical and Electronics Engineers standard 802.16e.

9. A method for improving the efficiency of a mobile station during a listening interval, comprising:

during an idle mode, receiving from a base station a paging message indicator or a neighbor advertisement message indicator, wherein the paging message indicator indicates whether a paging message is the last paging message designated for the mobile station in the listening interval and the neighbor advertisement message indicator indicates the presence of a neighbor advertisement message; and based on the paging message indicator, determining that no other paging messages are present in the listening interval or based on the neighbor advertisement message indicator, determining that no neighbor advertisement message is present.

10. The method according to claim 9, further comprising switching to another function other than continuing to receive in the listening interval during the remaining portion of the listening interval if it is determined that no other paging messages are present in the listening interval or switching to another function other than continuing to receive for the neighbor advertisement message during the duration of time reserved for processing a neighbor advertisement message if it is determined that no neighbor advertisement message is present.

11. The method according to claim 10, wherein switching to another function comprises switching to a low power state.

12. The method according to claim 9, wherein the mobile station is assigned to a group, wherein the group has a predetermined paging cycle and the listening interval defines the beginning of the paging cycle, the listening interval is comprised of one or more frames and wherein the neighbor advertisement message is positioned after the listening interval.

13. The method according to claim 9, wherein the paging message indicator or the neighbor advertisement message indicator is received in a paging message map of a paging message.

14. The method according to claim 13, wherein the paging message map is a vendor specific type-length-value for Institute of Electrical and Electronics Engineers standard 802.16e.

15. A base station that improves the efficiency of a mobile station during a listening interval, comprising:

a transmitter; and a processor communicatively coupled to the transmitter, wherein the processor is programmed to:

set a paging message indicator or a neighbor advertisement message indicator, wherein the paging message indicator indicates whether a paging message is the last paging message designated for the mobile station in the listening interval and the neighbor advertisement message indicator indicates the presence of a neighbor advertisement message; and instruct the transmitter to transmit the paging message indicator or the neighbor advertisement message indicator to the mobile station.

16. The base station according to claim 15, wherein the transmitter transmits the paging message indicator or the neighbor advertisement message indicator to the mobile station in a paging message map of a paging message.

17. The method according to claim 16, wherein the paging message map is a vendor specific type-length-value for Institute of Electrical and Electronics Engineers standard 802.16e.

18. A mobile station, comprising:

a receiver; and a processor, wherein the processor is communicatively coupled to the receiver, wherein the processor is programmed to:

in an idle mode, receive a paging message indicator or a neighbor advertisement message indicator, wherein the paging message indicator indicates whether a paging message is the last paging message designated for the mobile station in a listening interval and the neighbor advertisement message indicator indicates the presence of a neighbor advertisement message; and based on the paging message indicator, determine that no other paging messages are present in the listening interval or based on the neighbor advertisement message indicator, determine that no neighbor advertisement message is present.

19. The mobile station according to claim 18, wherein the processor is further programmed to switch to another function other than continuing to receive in the listening interval during the remaining portion of the listening interval if the processor determines that no other paging messages are present in the listening interval or to switch to another function other than continuing to receive for the neighbor advertisement message during the duration of time reserved for processing a neighbor advertisement message if the processor determines that no neighbor advertisement message is present.

20. The mobile station according to claim 19, wherein the processor is programmed to switch to another function by placing the mobile station in a low power state.

* * * * *